UNITED STATES PATENT OFFICE.

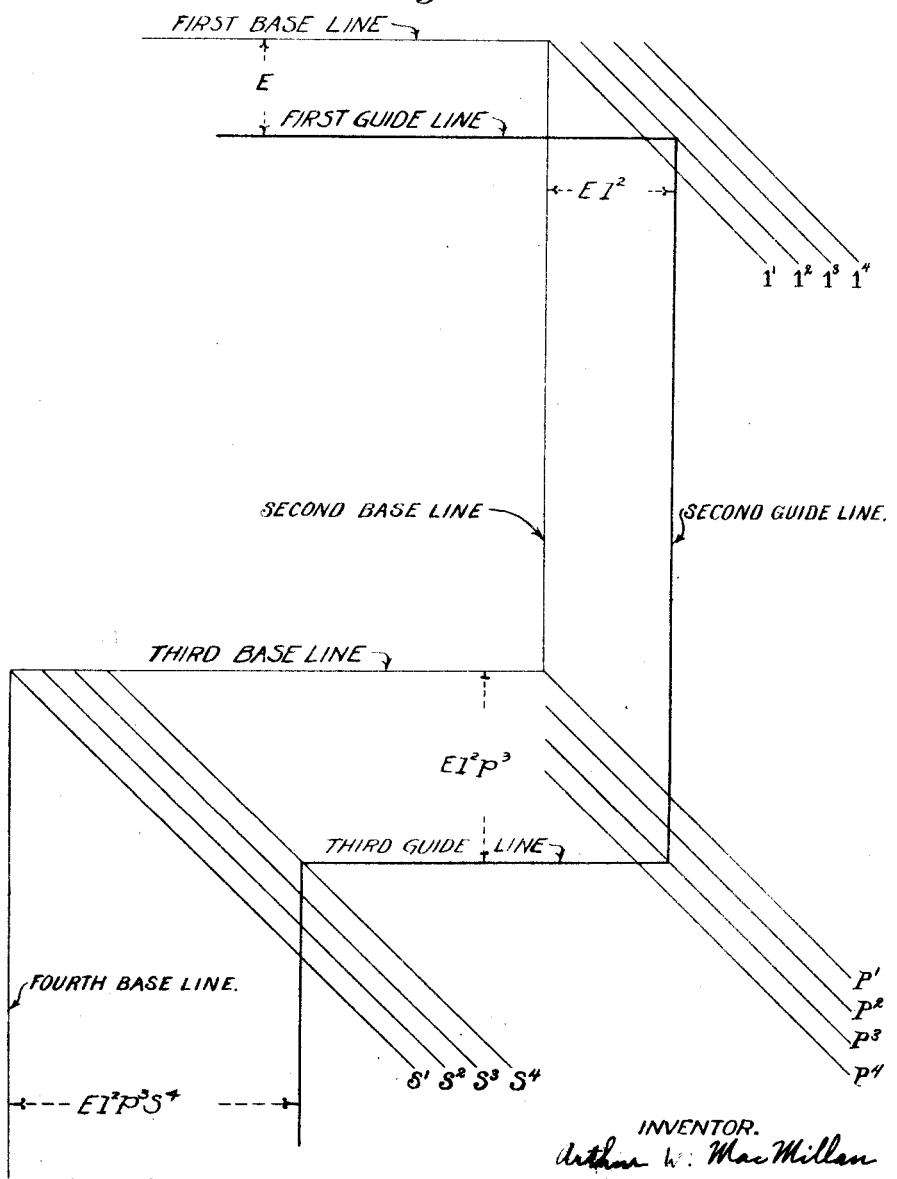

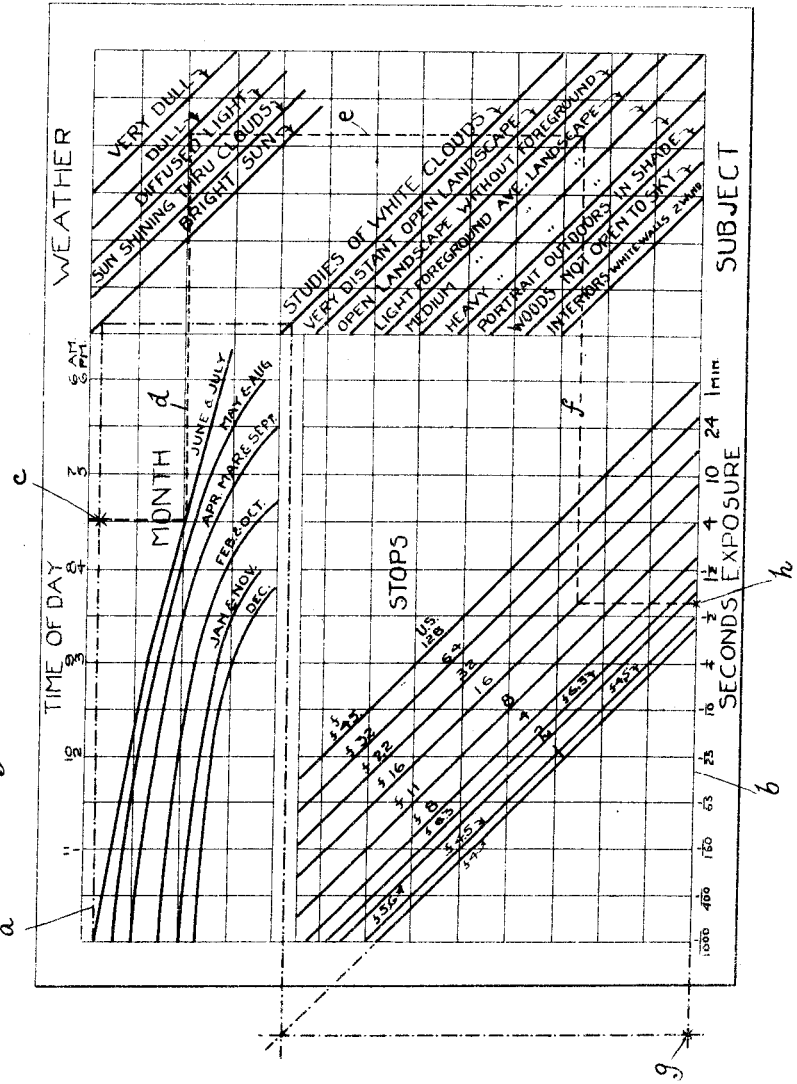

ARTHUR W. MacMILLAN, OF CHICAGO, ILLINOIS, ASSIGNOR OF ONE-HALF TO ALBE H. GRAVES, OF CHICAGO, ILLINOIS.

CALCULATING DEVICE.

1,195,702.

Specification of Letters Patent.

Patented Aug. 22, 1916.

Application filed February 6, 1915. Serial No. 6,404.

*To all whom it may concern:*

Be it known that I, ARTHUR W. MACMILLAN, a citizen of the United States, residing in Chicago, in the county of Cook and State of Illinois, have invented certain new and useful Improvements in Calculating Devices, of which the following is a specification.

This invention relates to improvements in calculating devices, and refers more particularly to a device for rapidly and accurately determining, without the use of involved arithmetical computations, the value of a quantity which is the result of the combined effect of several variable conditions or circumstances modifying the subject-matter of the calculation.

Although the invention is capable of many modifications for different uses, yet I have found it to be of particular service in connection with photography. Hence, I will describe, as a specific application of the invention, a device for rapidly and accurately determining the correct exposure period for photographic plates or films when exposed under any stated chronological, weather, subject, and instrument, conditions.

The specific embodiment which I have selected as illustrating the application of my invention contemplates the provision of a graphic exposure chart in which the several more important variables which enter into the conditions controlling the proper time of exposure may be readily taken into account and due allowance made therefor with accuracy and despatch; a chart of such form and simplicity that a chart sheet may be used, if desired, for each exposure and a graphic record of the determinations made and preserved; a form of chart which wholly dispenses with every kind of arithmetical calculation and resolves itself simply into the tracing of lines, yet takes into account all of the important variables in making the deductions; a chart in which is disclosed an underlying principle of construction and arrangement enabling it to be made for any given zone or latitude in the world; and, in general, an improved calculating device of the character referred to.

To the above ends the invention consists in the matters hereinafter described and more particularly pointed out in the appended claims.

Figure 1 shows my invention embodied diagrammatically in a device for graphically calculating exposure values affected by a plurality of exposure conditions, and Fig. 2 represents in concrete form a plan view of an actual exposure chart made according to the principles disclosed in Fig. 1.

The principles of my invention will be readily understood by reference to Fig. 1 and the following description. In said figure, the short horizontal line at the top of the figure represents an initial base line or datum level from which are measured or set off (as ordinates) the starting or predetermined value of the quantity which is subject to varying conditions and whose value as affected or modified by said varying conditions is to be graphically calculated. In the present case the level or height of the first initial base line represents a certain exposure period, according to standard conditions of calendar, hour of the day, light value, kind of picture and stop opening with a standard speed of photographic plate. The standards which I prefer to adopt are maximum values in each case in order to simplify the chart.

The ordinate E represents, according to a predetermined logarithmic or geometric scale, a certain increase of exposure time necessary for a given time of the year and hour of the day. That is to say, the points located between the lower end of the ordinate E and the first base line will represent factors, arranged in a regular geometrical progression, for multiplying the original or standard exposure period, the value of which is represented by the first base line. In the upper right hand corner of the figure I lay off a set of oblique lines $l^1$, $l^2$, $l^3$, $l^4$ which represent light values corresponding to different atmospheric conditions, the first oblique line $l^1$ representing an atmospheric condition which has a maximum light value, and the other oblique lines $l^2$, $l^3$ and $l^4$ representing certain atmospheric conditions having lower light values. These oblique lines $l^1$, $l^2$, $l^3$ $l^4$ are spaced apart according to their multiplying effect upon the original standard or maximum atmospheric light condition and are arranged in a geometrical progression. For instance, if the condition $l^2$ require double the exposure of the condition $l^1$, the line $l^3$, which, in the present case, is spaced apart from the line $l^1$ twice as far as the spacing between the lines $l^1$ and $l^2$, would represent an atmospheric condition requiring four times as long an exposure as would the condition $l^1$. Similarly, the oblique line $l^4$ would represent an atmospheric condition requiring eight times as long an exposure as the original condition $l^1$, assuming of course that the lines $l^1$, $l^2$, $l^3$, $l^4$ were equally spaced apart. It is not essential that the inclination of the oblique parallel lines $l^1$, $l^2$, $l^3$, $l^4$ should be at any definite angle to the first base line. However, for convenience, I employ an angle of 45°, which enables me to plot my geometrical logarithmic values all to the same scale, the sine and cosine of said angle being equal, thereby making the preparation and use of the chart as simple as possible.

At the intersection of the first base line with the oblique line $l^1$ there is drawn the second base line, which, in this case, is found to be at right angles to the first base line. We are now ready to calculate graphically the length of exposure E as modified by one of the inferior atmospheric conditions, $l^2$, $l^3$, or $l^4$. In the present instance we select $l^2$. At the lower end of the ordinate E I simply draw a line, which, for convenience, I call a "first guide line", parallel to the first base line, and which intersects the oblique line $l^2$ thus giving me the distance, which I call E $l^2$, between the points of intersection of said first guide line with the second base line and the oblique line $l^2$. Measurement of the distance E $l^2$ in comparison with a predetermined geometric scale similar in character to the geometric scale to which is plotted initial exposure value E, will give the proper exposure value of the original exposure period E when subjected to the inferior atmospheric condition $l^2$. It should be understood that the spacing of the lines $l^1$, $l^2$, $l^3$, $l^4$ is measured in a direction which is parallel to the first base line, since the first guide line is always drawn parallel to said first base line, irrespective of the inclination of said oblique lines $l^1$, $l^2$, $l^3$, $l^4$, or of the angle which the second base line makes with the first base line. It should also be noted that the spacing apart of the lines $l^1$, $l^2$, $l^3$, $l^4$, measured in a direction parallel to the first base line, is always proportionate to the angle made by the second base line with the base lines $l^1$, $l^2$, $l^3$, $l^4$; so that whatever the initial starting value E may be and at whatever distance the first guide line may be drawn from the first base line, the second geometric scale, by which are measured the distances between the second base line and the points of intersection of the first guide line with the oblique lines $l^1$, $l^2$, $l^3$, $l^4$, will always be in accord with the geometric values representing the distances apart of said oblique lines. However, since I have adopted an angle of 45° and have used the same geometric scale for the initial values E and for the atmospheric values $l^1$, $l^2$, $l^3$, $l^4$, I am enabled to employ for measuring off the corrected value E $l^2$ the same geometric scale which is used to lay off the initial value E. In this respect the scales which I employ are similar to those found on the ordinary slide rule for dividing or multiplying numerical quantities.

Now that the principle of the invention has been disclosed, I will explain how I extend its application so as to take care of more than one variable condition to which the initial predetermined value is subjected. For instance, in the diagrammatic embodiment of the invention which I am describing as applied to determining exposure values for photographic purposes, it is possible to take into account every variable condition which is encountered in photography. However, in order to simplify the description, the variables representing differences in conditions of picture values and stop values are the only additional variables which I shall describe here. In the diagram, Fig. 1, it will be observed that at the lower side of the second base line I have drawn an oblique line $p^1$ also at 45° to the second base line and representing a subject or picture which requires the minimum exposure period, the oblique lines $p^2$, $p^3$, $p^4$ representing the subjects or pictures of lower light emanating quality, which require progressively longer exposures than in the case of the standard or maximum subject or picture represented by $p^1$. At the intersection of the second base line with the line $p^1$ I draw a third base line which is at right angles to the second base line. It is of course understood that the spacings of the lines $p^1$, $p^2$, $p^3$, $p^4$, measured in a direction parallel to the second base line, represent, plotted according to a geometric scale, factors for multiplying the unmodified or standard exposure values. The second guide line is drawn parallel with the second base line from the intersection of the first guide line with the atmospheric light value line $l^2$ and is extended downwardly until it intersects the line which corresponds to the particular kind of picture which it is desired to photograph. In the present case we will assume that this is the line $p^3$. The perpendicular distance E $l^2$ $p^3$ measured from the third base line to intersection of the second guide line of line $p^3$ then represents, according to the proper geometric scale, a length of exposure which is the original exposure value E as modified by the atmospheric conditions $l^2$ and picture value condition $p^3$. In a similar manner I am enabled to allow for various stop values. For example, at the left hand of the third base line I may draw another set of oblique lines $s^1$, $s^2$, $s^3$, $s^4$ representing various stop values, and at the intersection of the third base line with the stop value representing a standard or maximum lens opening. I draw a fourth base line which is perpendicular to the third base line and at an angle of 45° to the oblique stop lines. The third guide line is drawn from the intersection of the second guide line with the picture value line $p^3$ and is made parallel to the third base line so as to intersect the oblique stop value lines. If it be desired to calculate a length of exposure in which a stop $s^4$ is to be used, the third guide line is continued until it intersects the line $s^4$. The resultant exposure period is then measured from said intersection to the fourth base line and, according to the proper geometric scale, is represented by the distance $b^2 p^3 s^4$. It is manifest that the same principle could be extended in order to compensate for various types of plates or films of different speeds, or for any other variable conditions which might be encountered in practice.

Although I have described my invention as applied to calculating exposure periods, it should be understood that the invention is capable of a vast number of applications; in fact, it will be found of value wherever it is necessary to calculate the modifying effect of one or more variable conditions.

I will now describe the exposure chart shown in Fig. 2, which illustrates a practical application of my invention to the camera art and utilizes the principles described in connection with Fig. 1.

An exposure device or guide embodying my invention is developed on the principle or theory that the most intense light of that time of the day and year when light is strongest, taking a photograph of the subject of greatest light-reflecting value and the exposure made with the largest stop, will require a minimum period of exposure, and may therefore represent one end of a scale, the other end of which scale is determined by the lowest light value of the sum of the several functions entering into an exposure made under the most adverse conditions, i.e., with the lowest light values which are to be dealt with. On such plan it will seem, upon consideration, that all the variables dealt with will represent increments of time in the corrected time exposure, because such variables are each and all of less light value than the maximum. By platting the several variables all on the same scale, allowances in time are represented by distance, and by simply adding them together and referring the sum of total distance to the final exposure scale (which is, of course, platted on the same dimension scale) the corrected time exposure of any given set of conditions is directly ascertained. The final scale will not be in direct proportion to the actual length of the exposure period but will be a function thereof, preferably a geometrical or logarithmic scale, so that increments of length of the several variables when added together have a multiplying effect on the initial value of exposure period.

The foregoing principles of construction and arrangement will be better understood from a description of the illustrated chart shown in Fig. 2, which embodies one example thereof. On suitable coördinate paper, I develop a group of curves or graduations for the different times of year, each such curve representing a period during which the light is of approximately equal value, and all of the curves being properly coördinated with a scale of hours of the day. In the chart this group of time curves is associated with the word "Month", and they are severally designated by the months to which they pertain. The hour scale referred to is arranged along the axis of ordinates common to these time curves, and designated $a$. The distance or length of ordinate from any point on the axis of ordinates $a$ to a point of intersection on a given month curve corresponds to the length of time exposure for the time so coördinated.

To the right, and horizontally opposite the group of month curves is provided a group of weather curves or graduations under the heading "Weather"; these curves being arranged at an angle of 45° with reference to the squares of the paper, and inasmuch as they represent more or less arbitrary graduations of the weather variables, they are made straight and parallel. It will be noted that, reading from left to right, the first graduation—"Bright sun"—represents the highest light value, and each succeeding graduation a lower light value, to the lowest—that designated "Very dull". The projected distances between these weather-variable graduations represent the allowances (in length) on the scale for increased time of exposure due to the existence of such variables. Hence, the projected distance from the curve designated "Bright sun" to the curve designated "Very dull" would represent the allowance for an exposure time on a very dull day, while if such exposures were made with "Bright sun" no allowance would be made for weather-variable.

Vertically below and opposite the group of weather curves is another group of such curves or graduations, designated as a group "Subject", and which curves are severally marked with proper legends. Here again the uppermost curve, or that nearest the weather curves, represents the highest light value, and the lowermost the lowest light value, and, so also, the vertical spacing between curves represents in distance the allowances for the several variables measuring downward from the first curve "Studies of white clouds" as zero.

To the left, and horizontally opposite the subject curves, is arranged a group of stop curves, designated "Stops". The stop curve to the extreme right represents the smallest stop used in practice, viz., the F 45 or U. S. 128 stop, and the successive stop curves from right to left are platted to correspond with the usual graduation of stops. Hence, treating the curve F 4 as unity, the distance from left to right across the entire series of stop curves horizontally will represent the maximum allowance to be made when using the smallest stop.

Directly below the group of stop curves, and extending along the axis of ordinates $b$ of this group of curves, is the final exposure scale laid out in units of time, and designated "Seconds exposures". In the example given, this scale follows the graduations commonly adopted by American cameras, from .001 second to one full minute, and while these values are approximately on the geometrical progression of 2¼, still the graduation marks are not exact, but represent conveniently approximated fractions.

The chart described may be used either by tracing the successive allowances through with the eye, by the aid of the vertical and horizontal lines, or may be more accurately and reliably traced by drawing a continuous pencil line from one variable to another, and finally to the exposure scale, thus not only enabling the artist to verify his tracing, but giving him a record which he may permanently preserve if he so desires. To illustrate, suppose it be desired to make an exposure at half past eight or half past four on a day in June or July, the weather being dull, the subject an average landscape, and stop selected No. 16. The artist will start from the star, designated $c$ in the drawing, trace the ordinate to its intersection with the "June and July" curve, then turn at right angles along the line $d$ to the point of intersection with the curve marked "Dull", at that point turn at right angles and trace downwardly along the dotted line designated $e$ to an intersection with the curve marked "Average landscape", then at right-angles along the dotted line $f$ to a point of intersection with the stop line 16, and then project at right-angles downwardly to an intersection with the "seconds exposure scale". This will show that the proper exposure for the conditions referred to should be about ⅗ of a second, but the camera shutter would need to be set at the ½ second, as being the nearest approximation to this correct time.

It will be seen upon consideration that this chart, as devised, enables the operator to cumulate the proper allowances and project the sum of these allowances across the scale in a purely mechanical way, i. e., without calculation. This feature is in itself an important characteristic of this specific embodiment of the invention.

Explaining how the operation of the scale may be verified, it will be understood that inasmuch as the actual foot of the scale shown starts with a .001 exposure, the datum point of the scale would be considerably below or to the left of the .001 graduation mark. Its theoretical location is indicated in dotted lines at $a$, and this point is determined by extending the axis of ordinates of the month group until it intersects the first of the weather curves, thence continuing at right-angles until the line intersects the first of the subject curves, and then at right-angles horizontally to the left to a point which intersects the continuation of the largest stop curve, $f^4$, and finally at right-angles downwardly to a point of intersection with the scale line $g$.

To verify the determining of the set of conditions above traced as an example, the following allowances are cumulated, and this may be readily done with a pair of dividers: from star $c$ to intersection with "June and July" curve; from curve "Bright sun" to curve "Dull"; from curve "White clouds" to curve "Average landscape"; from stop curve $f^4$ or 1 to stop curve 16. These distances cumulated will represent the distance between the theoretical foot of the scale designated $g$, and the correct exposure time, designated $h$.

It will be observed that in the practical embodiment shown in Fig. 2, the only scale shown is the final scale, by which I take off the final corrected values for the time of exposure as modified by the different variables. Inasmuch as the final scale is the only one which need be used for this purpose, it is unnecessary to provide intermediate scales for the other parts of the chart. Similarly, it is unnecessary actually to draw on the commercial chart the various base lines used in laying out the time curves or the oblique variable lines. When laying out the chart initially it is of course necessary to establish virtual base lines from which to set out the various curves and lines, although these may not be shown in the printed chart which is furnished to the photographer. As a matter of fact, the guide lines are coordinate lines in effect, or base lines.

The month curves coördinated with time of day have been platted with approximate correctness from ascertained data for a latitude corresponding to Chicago. It will be observed that the curves representing exposure values at different hours for the various months are not parallel with each other, nor are they straight, but drop off abruptly at their right-hand ends. This is because in the winter or early spring months at certain hours of the day the light values change much more rapidly than in the middle part of the day. Hence, the use of graphic curves for the initial exposure values is particularly advantageous and is far more reliable and accurate than a table. The weather curves and the subject curves represent estimates in the classification of the allowances, and, as shown, have been uniformly spaced apart. These spacings may be changed, if practical and widely extended use of the chart indicates a better spacing, i.e., a spacing which more correctly coincides with the average judgment of the users in determining these weather and subject conditions. The stop curves have been spaced with approximate correctness to correspond with the sizes of ops which have been generally adopted in photography.

It will, of course, be understood, now that principles of the invention have been explained, that the invention may be embodied in forms different from the particular chart herein shown.

In actual practice the chart is printed on inexpensive sheets of paper and a multiplicity of sheets bound into a tablet, so that the artist may make his exposure record, and such other data as he chooses, on the sheet, and then remove the sheet from the tablet for preservation; thus using a new sheet for each exposure.

In the matter of simplicity of use, compactness of forms, and simplicity of arrangement, the particular embodiment herein shown has special advantages of its own, which are made the subject of specific claims. The making of specific claims is not to be understood as implying that the broader claims are to be construed as relating to this specific type of the invention.

I claim:

1. A calculating device, comprising a sheet having marked on a portion of its area a curve, the ordinates of which represent predetermined values of a quantity, a set of guide-lines extending from said area and making an angle with said ordinates, a set of oblique, parallel cross-lines intersecting said guide-lines at an angle, said cross-lines being spaced apart proportionate to the modifying effects of predetermined values of a variable which they represent, and a third set of parallel guide-lines intersecting said first two sets of lines and spaced apart proportionate to the differences between the values of the corrected resultant quantity to be determined, the positions of said last-named lines, when referred to a suitable common scale, representing, as modified by said variable, corrected values of the original predetermined quantity.

2. A device for multiplying predetermined values of a quantity with different values of a variable quantity, comprising a chart having marked on a portion of its area, points, the distances of which from a virtual base line represent predetermined standard values of an initial quantity, a set of guide-lines extending from said area and parallel to said base line, a set of oblique parallel cross-lines intersecting said guide-lines at an angle, said cross-lines being spaced apart proportionate to the multiplying effect of the variable and according to a geometric scale, and a set of parallel guide-lines at right angles to the first set intersecting said first two sets of lines and spaced apart proportionate to the differences between the corrected values of the multiplied original quantity, the distances of said last-named lines from a base line at right angles to said first base line, when referred to a suitable geometric scale, representing, as modified by said variable, the product of the original quantities as multiplied by said variable.

3. A graphic calculating device for determining the modifying effect of a variable upon an original predetermined quantity, comprising a sheet having inscribed on its face a set of oblique, parallel lines, spaced apart proportionate to the predetermined modifying effects on said original quantity of different values of a variable condition represented by said lines, increments of spacing representing increments of modifying effect, said oblique lines being suitably arranged to be intersected by a guide-line drawn parallel to an initial virtual base line and at a distance therefrom proportionate to a predetermined value of the initial unmodified quantity, increments of said distance representing increments in value of said quantity according to an initial scale, the distances of the points of intersection of said guide-line with the oblique lines from a second virtual base line making angles with said oblique lines and said guide-lines, representing, when referred to a suitable scale, corrected values of said original quantity as modified by the different values of said variable represented by said oblique lines.

4. A graphic calculating device for determining the modifying effect of two variables upon an original predetermined quantity, comprising a sheet having inscribed on its face a set of oblique, parallel lines, spaced apart proportionate to the predetermined modifying effects on said original quantity of different values of a variable condition represented by said lines, increments of spacing representing increments of modifying effect, said oblique lines being suitably arranged to be intersected by a guide-line drawn parallel to an initial virtual base line and at a distance therefrom proportionate to a predetermined value of the initial unmodified quantity, increments of said distance representing increments in value of said quantity according to an initial scale, the distances of the points of intersection of said guide-line with the oblique lines from a second virtual base-line, making angles with said oblique lines, representing partially corrected values of said original quantity, a second set of oblique parallel cross lines, analogous in character and function to said first set and representing values of a second variable and arranged to be intersected by a guide-line drawn parallel to said second base-line from one of said intersections, the distances of the points of intersection of said second guide-line from a third virtual base line making angles with said second guide-line and said second set of oblique lines, representing, when referred to a suitable scale, finally corrected values of said original quantity as modified by the variables represented by said sets of oblique lines.

5. A chart for determining the effect of a predetermined variable light condition upon a predetermined standard exposure period, comprising a chart having marked on a portion of its area points, ordinates to which from a virtual base line represent standard exposure periods at different times under various calendar conditions, the values of said ordinates being plotted to a suitable geometric scale whereby increments in length represent multiplying factors, a set of parallel guide-lines crossing said area parallel to said base line, a set of parallel oblique cross-lines intersecting said guide-lines and spaced apart proportionate to the multiplying effect of different values of a variable light condition represented by said cross-lines, a second set of parallel guide-lines intersecting said first two sets of lines and spaced apart proportionate to a suitable geometric scale, increments of spacing of which represent increments of multiplying power, a second set of oblique parallel cross-lines analogous in character and function to said first set and representing values of a second variable light condition, guide-lines intersecting said cross-lines and said second set of guide-lines, the spacings of which also represent multiplying factors plotted to a geometric scale, a third set of parallel oblique cross-lines intersecting said last named guide-lines and representing stop values, and a final scale representing finally corrected exposure periods plotted to a suitable geometric scale and connected by guide-lines to said last named set of parallel oblique cross-lines.

6. A graphic calculating device, comprising a sheet of paper having inscribed upon its surface a curve, the ordinates of which represent predetermined values of an initial quantity, the actual value of which when it is modified by a variable condition is to be determined, the points on said curve being plotted to a scale the graduations of which represent values of a geometric progression, a set of oblique cross lines adapted to be intersected by perpendiculars drawn from said ordinates toward said oblique cross lines, said oblique cross lines representing different values of the variable condition and spaced apart in the direction of said perpendiculars, according to a scale the equal graduations of which represent values of a geometric progression, increments of spacing of said oblique cross lines representing multiplying factors, the distances of the points of intersection of said perpendiculars with said oblique lines from a predetermined virtual base line representing, when referred to the same geometric scale by which said oblique cross lines are spaced, the values of the initial quantity as modified by said variable condition.

7. A chart for graphically determining exposure values, comprising a flat sheet having inscribed upon its surface a set of curves each representing a calendar condition, the ordinates from a virtual base line of points on each of said curves representing logarithms, the antilogs of which represent factors for multiplying a standard exposure period at particular hours of the day, a set of oblique cross lines adapted to be intersected by guide lines perpendicular to said ordinates, said oblique cross lines being spaced apart in the direction of said perpendiculars according to values of logarithms of quantities representing the multiplying effects of different values of the variable condition represented by the positions of said oblique cross lines, said latter named logarithmic values being measured from a second virtual base line, a second set of oblique cross lines, spaced apart in a similar manner, representing different conditions of the second variable and arranged to be intersected by guide lines drawn parallel to said last named base line from the intersections of the first guide lines with the first set of cross lines, a third virtual base line similarly arranged in connection with said second guide lines, a third set of oblique cross lines representing values of a third variable, spaced apart in a similar manner, and adapted to be intersected by guide lines drawn parallel with said third base line from the intersections with the second oblique cross lines of the second guide lines, a fourth virtual base line representing the base from which the logarithmic values of the third oblique line quantities are measured, and a final scale the graduations of which represent values arranged in geometric progression according to a logarithmic scale, said scale being adapted to be intersected by lines drawn parallel with said fourth base line and from the intersections of the third guide lines with said third set of oblique cross lines, the positions of said first, second, third and fourth base lines representing a time of exposure under standard conditions of all of the variables dealt with in the chart.

ARTHUR W. MacMILLAN.

Witnesses:
C. A. SOANS,
EMILIE ROSE.